US012725850B2

(12) United States Patent
Kim et al.

(10) Patent No.: US 12,725,850 B2
(45) Date of Patent: Sep. 1, 2026

(54) BATTERY SYSTEM COOLANT INFLOW MANAGEMENT DEVICE AND METHOD USING THE SAME

(71) Applicant: SEOYON E-HWA CO., LTD., Anyang (KR)

(72) Inventors: Sung Su Kim, Incheon (KR); Jung Jin Jeon, Siheung (KR)

(73) Assignee: SEOYON E-HWA CO., LTD., Anyang (KR)

( * ) Notice: Subject to any disclaimer, the term of this patent is extended or adjusted under 35 U.S.C. 154(b) by 485 days.

(21) Appl. No.: 18/466,005

(22) Filed: Sep. 13, 2023

(65) Prior Publication Data

US 2024/0097233 A1 Mar. 21, 2024

(30) Foreign Application Priority Data

Sep. 19, 2022 (KR) ........................ 10-2022-0117539

(51) Int. Cl.
*H01M 10/63* (2014.01)
*B60L 58/26* (2019.01)
(Continued)

(52) U.S. Cl.
CPC ......... *H01M 10/63* (2015.04); *H01M 10/425* (2013.01); *H01M 10/613* (2015.04); (Continued)

(58) Field of Classification Search
None
See application file for complete search history.

(56) References Cited

U.S. PATENT DOCUMENTS

2008/0157721 A1* 7/2008 Kaneko ..................... H02J 7/52 320/136
2012/0156530 A1* 6/2012 Kang .................... H01M 10/63 429/50

(Continued)

FOREIGN PATENT DOCUMENTS

CN 109599626 B 1/2021
KR 20120067520 A 6/2012
KR 20200060754 A 6/2020

OTHER PUBLICATIONS

Office Action From Indian Patent Office Dated Dec. 22, 2025 Issued for Corresponding Indian Patent Application.

*Primary Examiner* — Yoshitoshi Takeuchi
(74) *Attorney, Agent, or Firm* — Harvest IP Law, LLP

(57) ABSTRACT

A battery system coolant inflow management device and a method using the same are provided. The coolant inflow management device, which is disposed in each of a portion through which a coolant flows into a battery system from a vehicle body cooling module and a portion through which the coolant flows from the battery system to the vehicle body cooling module to measure, compare, and adjust flow rates and temperatures of the coolant, includes a rotation unit which is rotated by movement of the coolant and measures the flow rate and the temperature of the coolant, a rotation panel control unit which measures and adjusts the number of revolutions of the rotation unit, and a communication module which transmits values measured by the rotation unit and the rotation panel control unit to a battery management system (BMS) and receives a signal from the BMS.

3 Claims, 5 Drawing Sheets

(51) Int. Cl.

| | |
|---|---|
| ***H01M 10/42*** | (2006.01) |
| ***H01M 10/613*** | (2014.01) |
| ***H01M 10/625*** | (2014.01) |
| ***H01M 10/6568*** | (2014.01) |

(52) U.S. Cl.
CPC ........... *H01M 10/625* (2015.04); *B60L 58/26* (2019.02); *H01M 2010/4271* (2013.01); *H01M 2010/4278* (2013.01); *H01M 2220/20* (2013.01)

(56) References Cited

U.S. PATENT DOCUMENTS

| | | | | |
|---|---|---|---|---|
| 2019/0260090 | A1* | 8/2019 | Herrema ............. | H01M 10/484 |
| 2020/0259229 | A1* | 8/2020 | Wu ..................... | H01M 10/625 |
| 2020/0313255 | A1* | 10/2020 | Wu ........................ | B60H 1/323 |

* cited by examiner

BATTERY SYSTEM COOLANT INFLOW MANAGEMENT DEVICE AND METHOD USING THE SAME

CROSS-REFERENCE TO RELATED APPLICATION(S)

This application claims priority from Korean Patent Application No. 10-2022-0117539, filed on Sep. 19, 2022, in the Korean Intellectual Property Office, the disclosure of which is incorporated herein by reference in its entirety.

BACKGROUND

1. Field

The following description relates to a battery system coolant inflow management system and a method using the same.

2. Description of Related Art

A vehicle including a high-capacity battery used as a power source is referred to as an electric vehicle. A secondary battery that can be charged and discharged is mainly used as such a battery. Specifically, the battery of the electric vehicle is used in the form of a battery pack in which a plurality of battery modules formed of a plurality of battery cells are connected to obtain necessary power.

In this case, there is a problem that a high current is input to and output from the battery cells to generate a large amount of heat when the charging or discharging is performed. Specifically, in the case of a lithium-ion battery, there is a risk of fire due to gas generated when the battery is overheated. That is, the battery includes a cooling device to prevent the degradation of battery performance and an unsafety problem due to the overheating.

Such a cooling device uses a coolant which circulates around a surface of the battery to prevent overheating of the battery. In this case, the coolant circulates around the surface of the battery according to only an input set value of the coolant inflow device without using a separate management device. However, when the coolant circulates around the surface of the battery as described above, a flow rate of the coolant may not be constant due to a vortex section and the like, and a difference can be generated between an initial target set value and a flow rate of the actual circulation.

In addition, the temperature of the coolant continuously changes due to heat generated in a process of charging and discharging the battery while the coolant circulates around the surface of the battery. However, since there is no coolant temperature management device, a change amount of the temperature of the coolant cannot be managed in real time. That is, when the coolant is injected at a constant temperature even when a temperature of the battery changes, there is a problem that the battery becomes vulnerable to a risk of overheating.

SUMMARY

Embodiments of the present invention are directed to providing a battery system coolant inflow device capable of maintaining a temperature and a flow rate of a coolant within normal ranges by measuring, comparing, and adjusting the temperature and the flow rate of the coolant during inflow and outflow of the coolant of a battery system, and a method using the same.

However, technical objectives to be accomplished by embodiments of the present invention are not necessarily limited to the above-described technical objectives. Other technical objectives which are not described above will be clearly understood by those skilled in the art, to which the embodiments of the present invention belong, from following descriptions of the specification such as the detailed description.

In one aspect of the present invention, a coolant inflow management device, which is disposed in each of a portion through which a coolant flows into a battery system from a vehicle body cooling module and a portion through which the coolant flows from the battery system to the vehicle body cooling module to measure, compare, and adjust a flow rate and a temperature of the coolant, includes a rotation unit which is rotated by movement of the coolant and measures the flow rate and the temperature of the coolant, a rotation panel control unit which measures and adjusts the number of revolutions of the rotation unit, and a communication module which transmits values measured by the rotation unit and the rotation panel control unit to a battery management system (BMS) and receives a signal from the BMS.

In another aspect of the present invention, a method using a coolant inflow management device includes a first operation in which a temperature detection unit and a flow rate detection unit of a rotation unit measure a temperature and a flow rate of a coolant and a revolutions per minute (RPM) measurement unit of a rotation panel control unit measures RPM of the rotation unit, a second operation of transmitting information on the measured temperature and flow rate of the coolant and the RPM of the rotation unit measured in the first operation to a communication module, a third operation in which the communication module transmits information on the measured temperature and flow rate of the coolant and the RPM of the rotation unit to a battery management system (BMS), and a fourth operation in which the BMS determines whether the received temperature and flow rate of the coolant and the received RPM of the rotation unit are within normal ranges.

DETAILED DESCRIPTION

Hereinafter, embodiments of the present invention will be described with reference to the accompanying drawings. However, it is noted that the following embodiments are provided to facilitate understanding of the present invention, and the scope of the present invention is not limited thereto. The following embodiments are provided to more completely describe the present invention to those with average knowledge in the art, and detailed descriptions of known components determined to unnecessarily obscure the technical gist of the invention will be omitted.

Figure 1:
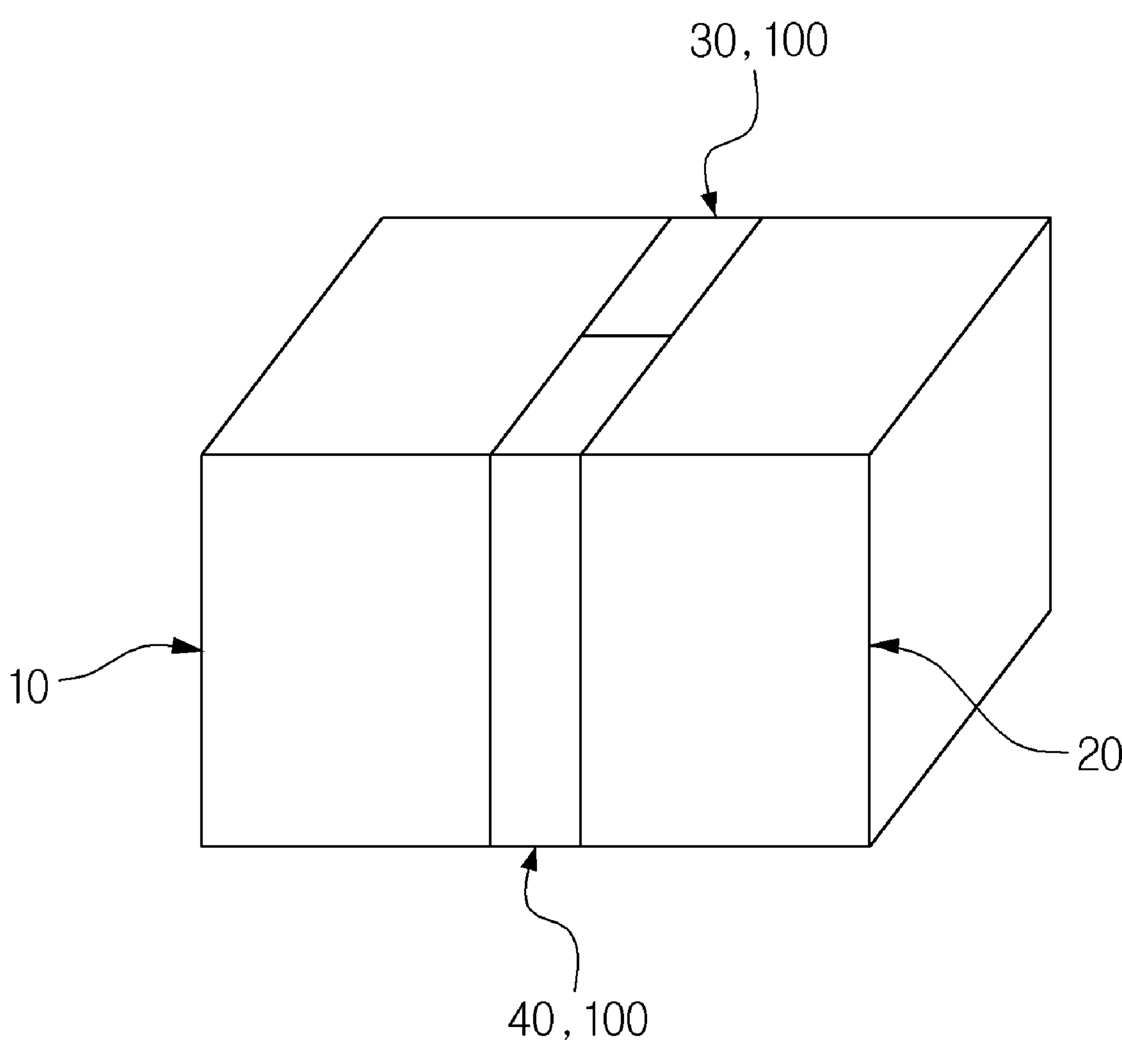
FIG. 1 is a perspective view illustrating a layout of a coolant inflow management device according to one embodiment of the present invention.
Figure 2:
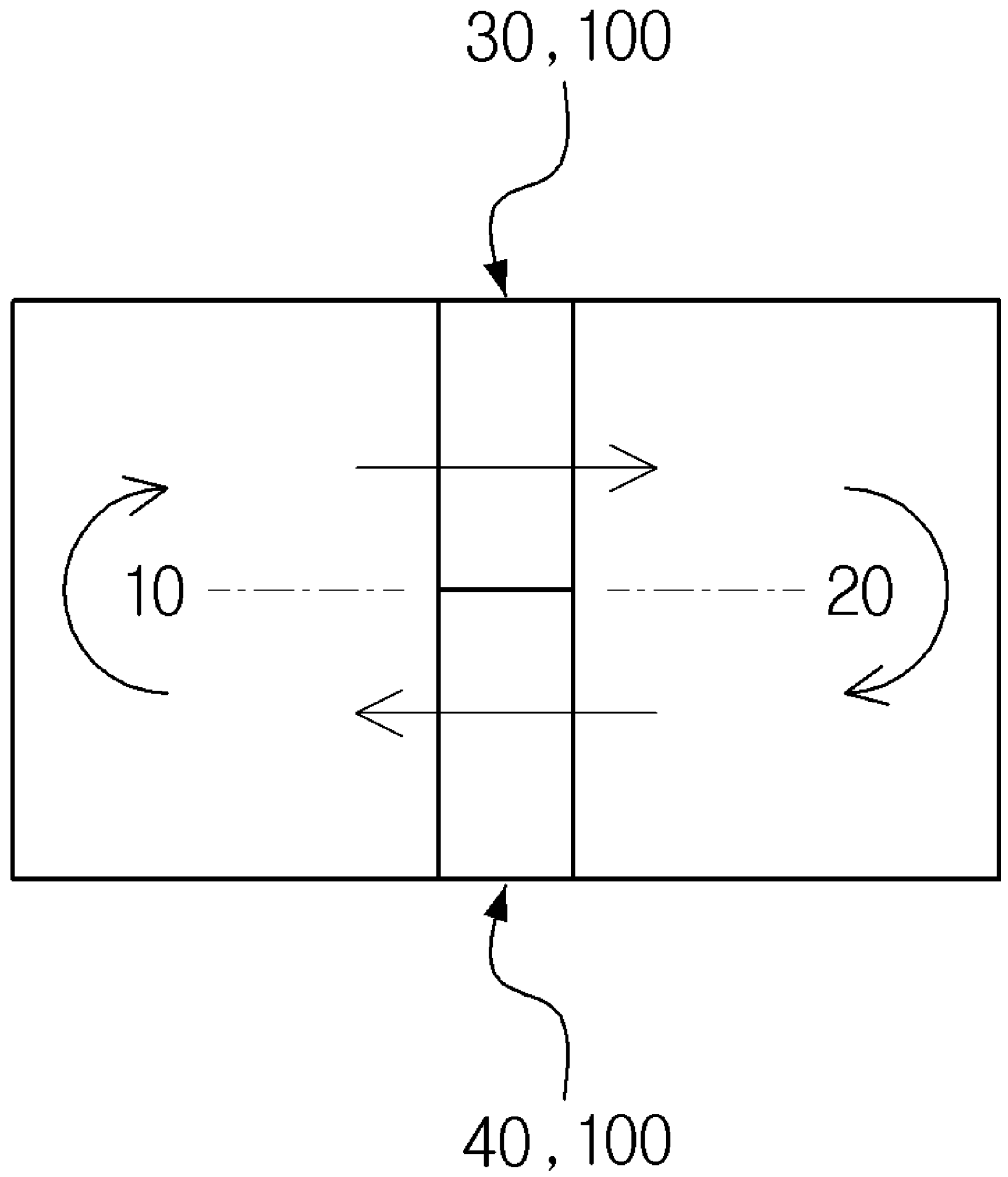
FIG. 2 is a plan view illustrating the layout of the coolant inflow management device illustrated in FIG. 1.
Figure 3:
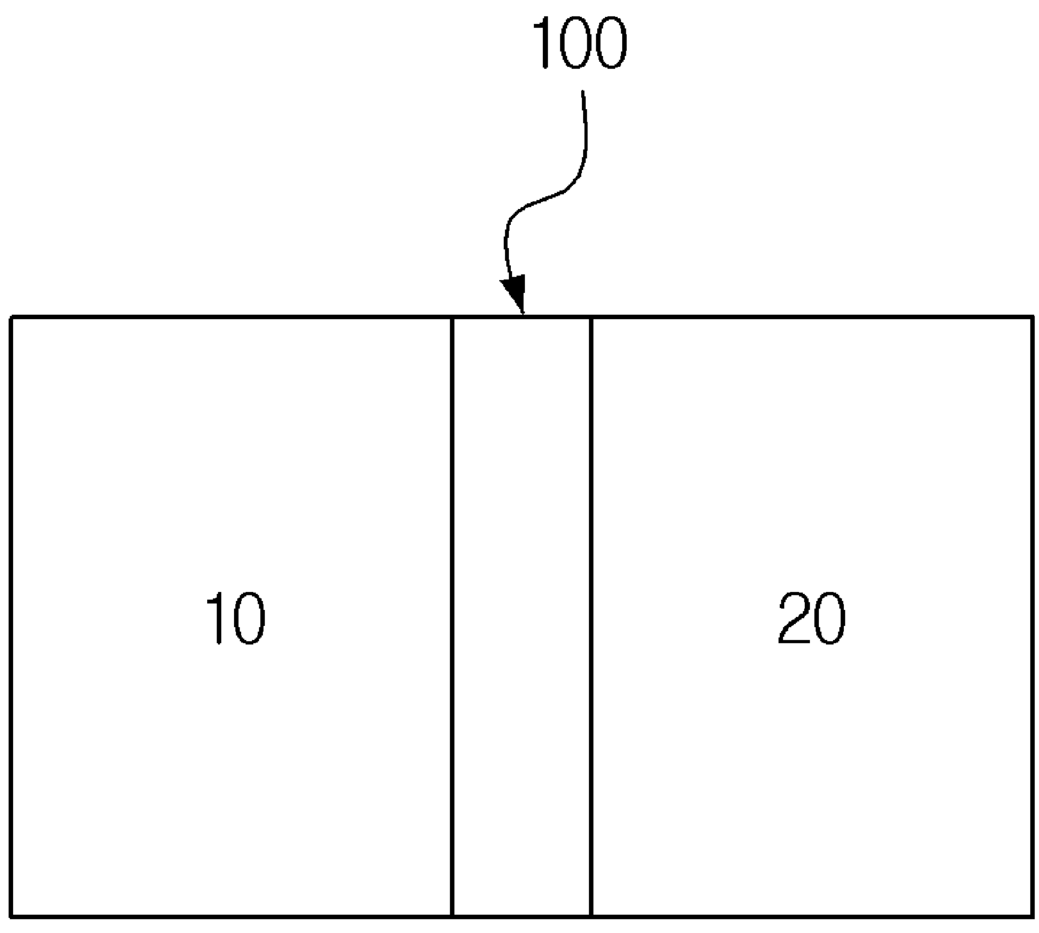
FIG. 3 is a front view illustrating the layout of the coolant inflow management device illustrated in FIG. 1.

FIG. 1 is a perspective view illustrating a layout of a coolant inflow management device according to one embodiment of the present invention. FIG. 2 is a plan view illustrating the layout of the coolant inflow management device illustrated in FIG. 1. FIG. 3 is a front view illustrating the layout of the coolant inflow management device illustrated in FIG. 1;

Referring to FIGS. 1 to 3, a coolant inflow management device 100 of the present embodiment may be disposed between a vehicle body cooling module 10 and a battery system 20 of an electric vehicle to stably maintain a flow rate (flow amount) and a temperature of a coolant. Specifically, a pair of coolant inflow management devices 100 may be disposed at a first entrance 30 through which the coolant moves from the battery system 20 to the vehicle body cooling module 10 and a second entrance 40 through which the coolant moves from the vehicle body cooling module 10 to the battery system 20.

Hereinafter, the above components will be described in more detail.

Figure 4:
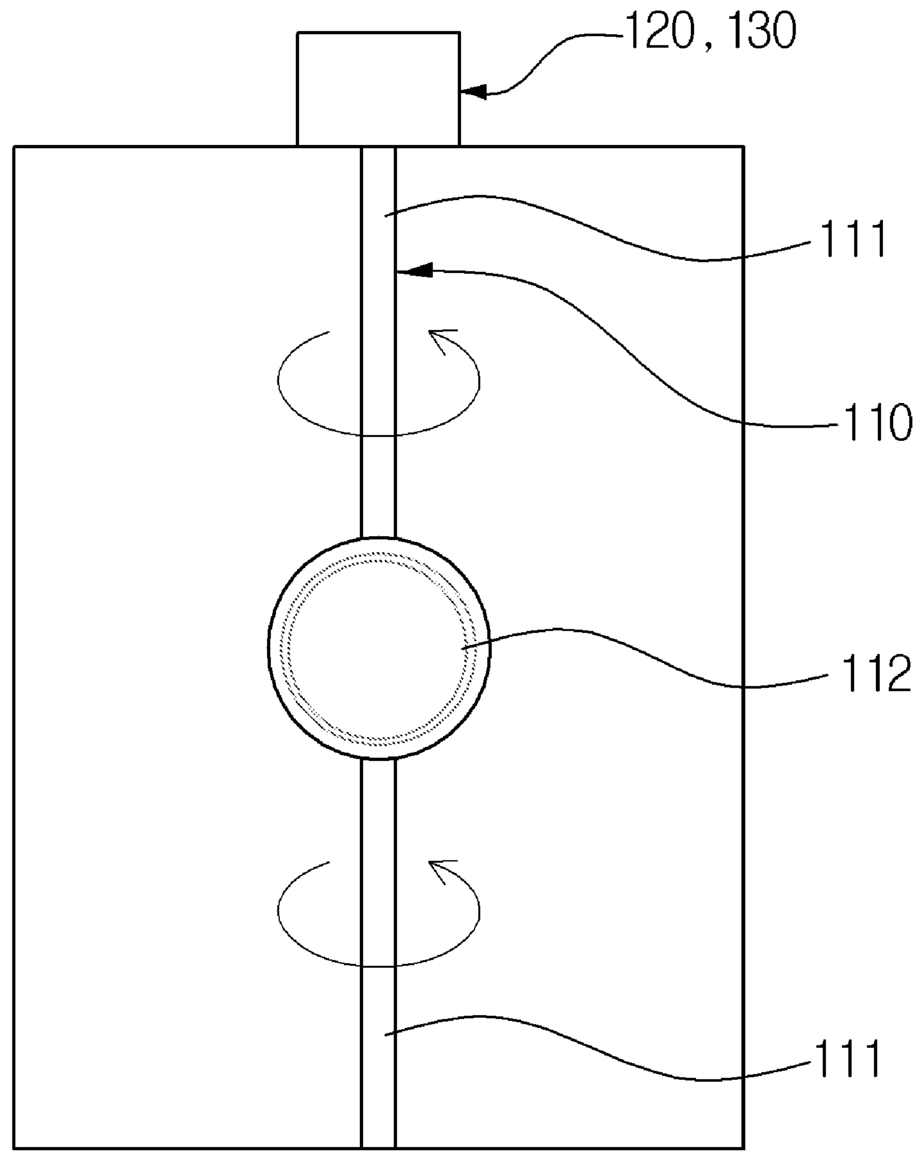
FIG. 4 is an enlarged view illustrating the coolant inflow management device illustrated in FIG. 1.

FIG. 4 is an enlarged view illustrating the coolant inflow management device illustrated in FIG. 1.

Referring to FIGS. 1 to 4, the coolant inflow management device 100 of the present embodiment may be disposed between the vehicle body cooling module 10 and the battery system 20 to measure a temperature and a flow rate of the coolant. More specifically, the pair of coolant inflow management devices 100 may be disposed at a portion through which the coolant flows into the battery system 20 from the vehicle body cooling module 10 and a portion through which the coolant flows from the battery system to the vehicle body cooling module 10. In this case, the portion through which the coolant flows into the battery system 20 from the vehicle body cooling module 10 is referred to as the first entrance 30, and the portion through which the coolant flows from the battery system 20 to the vehicle body cooling module 10 is referred to as the second entrance 40. That is, the coolant inflow management device 100 may be disposed at each of the first entrance 30 and the second entrance 40.

More specifically, the coolant inflow management devices 100 may measure temperatures and flow rates of the coolant when the coolant flows into the battery system and flows from the battery system 20 and compare amounts of changes in temperature and flow rate while the coolant passes through the battery system 20 so as to adjust the amounts of changes within normal ranges.

Specifically, the coolant inflow management device 100 may include a rotation unit 110 in which a panel type member rotates and which measures a temperature and a flow rate of the coolant, a rotation panel control unit 120 which may adjust an amount of rotation of the rotation unit 110, and a communication module 130 which transmits information measured by the rotation unit 110 and the rotation panel control unit 120 to a battery management system (BMS).

Hereinafter, the above components will be described in more detail.

The rotation unit 110 may be disposed in a central portion of the coolant inflow management device 100 in a vertical or lateral direction to be rotated by a flow of the coolant. Specifically, the rotation unit 110 may include a shaft 111, which is disposed in the central portion of the coolant inflow management device 100 in the vertical or lateral direction, and a rotation panel 112 which is a panel type member disposed on the shaft 111.

The shaft 111 may be formed as a cylindrical bar and disposed in the central portion of the coolant inflow management device 100 in the vertical or lateral direction. The shaft 111 may be formed to rotate in place. The plate-shaped rotation panel 112 is disposed on the shaft 111 so that the rotation panel 112 may be rotated by a flow of the coolant to rotate the shaft 111. One end of the shaft 111 may be connected to the rotation panel control unit 120 so that revolutions per minute (RPM) of the rotation unit 110 may be measured and adjusted.

The rotation panel 112 may be formed as the panel type member and rotated by an inflow of the coolant. The rotation panel 112 may be disposed on one side of the shaft 111, preferably, in the central portion of the shaft 111 to be freely rotated by a flow of the coolant without being interfered with by a case of the coolant inflow management device 100. In addition, the rotation panel 112 may be formed in a circular shape so that a force pushed by the flow of the coolant may not be biased to one side and the rotation panel 112 may be uniformly rotated.

Specifically, the rotation panel 112 may include a temperature detection unit **112*a* which measures a temperature of the coolant and a flow rate detection unit 112*b*** which measures a flow rate of the coolant.

The temperature detection unit **112*a* and the flow rate detection unit 112*b* are disposed on one side of the rotation panel 112 to measure the temperature and the flow rate of the coolant. Information on the temperature and the flow rate of the coolant measured by the temperature detection unit 112*a* and the flow rate detection unit 112*b* may be transmitted to the communication module 130** so that the BMS may determine whether the temperature and the flow rate are within normal ranges.

Meanwhile, the rotation panel control unit 120 may be connected to the shaft 111 of the rotation unit 110 to measure and adjust RPM of the shaft 111. That is, the rotation panel control unit 120 may be disposed to rotate the rotation unit 110 within the normal range by adjusting a speed of the rotation unit 110 when the rotation unit 110, which is freely rotated by the flow of the coolant, rotates with RPM out of the normal range.

Specifically, the rotation panel control unit 120 may include an RPM measurement unit 121 which measures RPM of the rotation unit 110 and a rotation amount control unit 122 which adjusts the RPM of the rotation unit 110 within a normal range.

The RPM measurement unit 121 may measure the RPM of the rotation unit 110 and transmit information on the measured RPM of the rotation unit 110 to the communication module 130. Specifically, the RPM measurement unit 121 may measure RPM of the shaft 111 and transmit information on the measured RPM to the BMS through the communication module 130.

When the RPM of the rotation unit 110 measured through the RPM measurement unit 121 is out of the normal range, the rotation amount control unit 122 decreases or increases a rotational speed of the rotation unit 110 so that the rotation unit 110 may rotate within the normal range. Specifically, when the rotation unit 110 rotates slowly out of the normal range, the rotation amount control unit 122 may control the rotation unit 110 to rotate faster to increase a flow rate by a certain degree. Conversely, when the rotation unit 110 rotates quickly out of the normal range, the rotation amount control unit 122 may control the rotation unit 110 to rotate slowly to reduce a flow rate by a certain degree.

More specifically, when a flow rate of the coolant excessively decreases or increases, the flow rate may be adjusted by adjusting an input amount of the coolant. On the other hand, when a flow rate of the coolant decreases or increases as much as a certain degree, the flow rate of the coolant may be adjusted as much as a certain degree by adjusting RPM of the rotation unit 110. That is, the RPM of the rotation unit 110 or an input amount of the coolant may be selectively adjusted according to a change in a degree of a flow rate of the coolant.

Meanwhile, the communication module 130 may be disposed at one side of the coolant inflow management device 100 to transmit information on a temperature and a flow rate of the coolant to the BMS. The information on the temperature and the flow rate transmitted through the communication module 130 may be transmitted to the BMS to determine whether the temperature and the flow are within the normal ranges. Then, when the temperature or the flow rate of the coolant are out of the normal ranges, the BMS may transmit a temperature or flow control signal of the coolant to the communication module 130. This will be described in more detail in an operation process of the coolant inflow management device 100 below.

Figure 5:
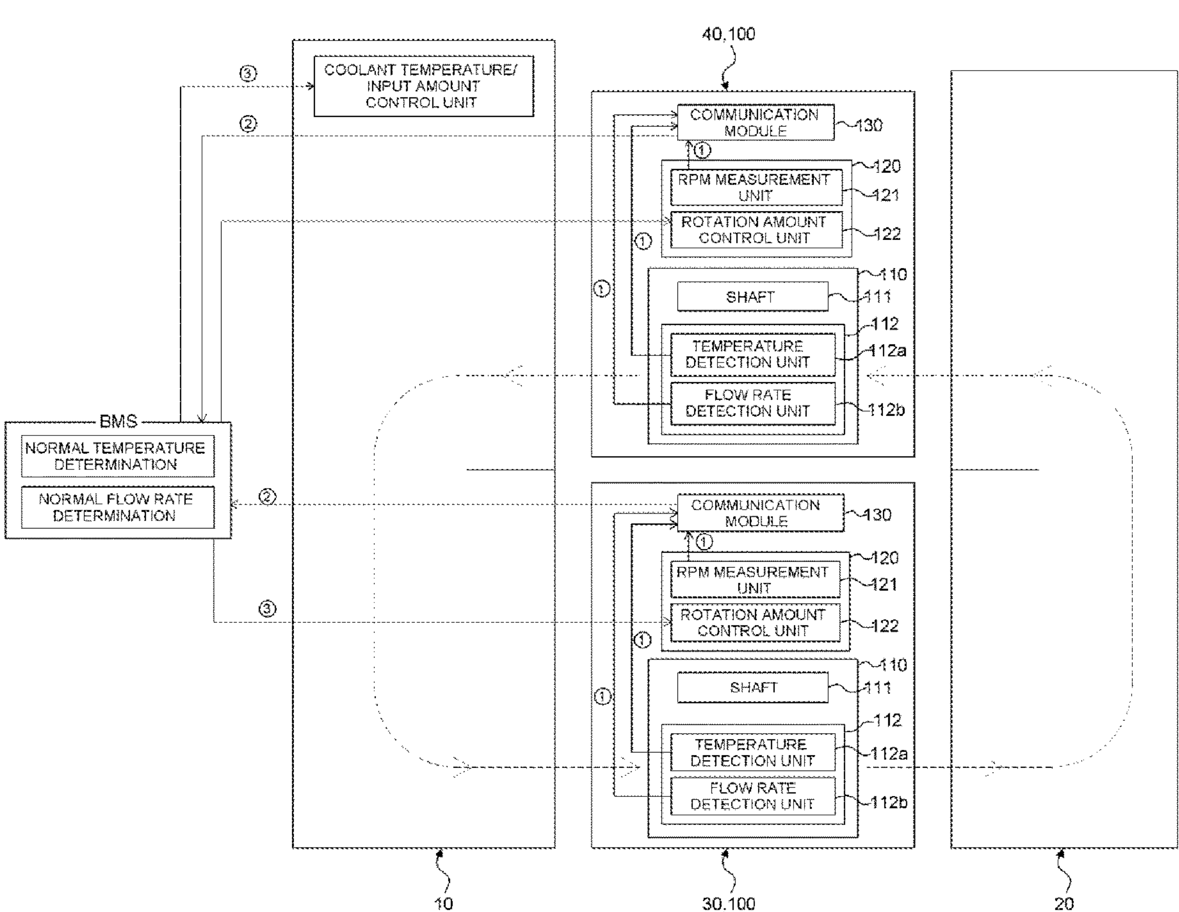
FIG. 5 is a block diagram of the coolant inflow management device illustrated in FIG. 1.

FIG. 5 is a block diagram of the coolant inflow management device illustrated in FIG. 1.

Referring to FIG. 5, the operation process of the coolant inflow management device 100 of the present invention will be described as follows.

The coolant serves to lower a temperature of a battery by repeating a process of coolant flowing into the battery system 20 from the vehicle body cooling module 10 to absorb heat generated by the battery and re-flowing from the battery system 20 to the vehicle body cooling module 10. In this case, the coolant inflow management device 100 disposed at each of the first entrance 30 and the second entrance 40 measures temperatures and flow rates of the coolant flowing into the battery system 20 and the coolant flowing from the battery system 20 (first operation).

Specifically, the temperatures and the flow rates of the coolant are measured by the temperature detection unit 112*a* and the flow rate detection unit 112*b* of the rotation unit 110, and the RPM measurement unit 121 of the rotation panel control unit 120 measures RPM of the rotation unit 110 and transmits measured information to the communication module 130 (second operation, ①). The communication module 130 transmits the received temperatures and flow rates of the coolant and RPM measurement values of the rotation unit 110 to the BMS (third operation, ②). In the BMS, the temperatures, the flow rates, and the RPM of the rotation unit 110 are compared to determine whether the temperatures, the flow rates, and the RPM of the rotation unit 110 are within normal ranges (fourth operation), and when the temperatures, the flow rates, and the RPM of the rotation unit 110 are within the normal ranges, a present progressing state is maintained without an additional instruction (5-1 operation).

On the other hand, when the temperatures of the coolant are out of the normal range, a faster cooling or heating signal is transmitted to a coolant temperature control unit of the vehicle body cooling module 10 so that the temperatures of the coolant become within the normal range (5-2 operation, ③).

Alternatively, when the flow rates of the coolant are out of the normal range by a certain degree, an RPM decrease or increase signal of the rotation unit 110 is transmitted to the rotation amount control unit 122 so that the flow rates of the coolant are within the normal range (5-3 operation, ③).

Alternatively, when the flow rates of the coolant are excessively out of the normal range, a coolant input decrease or increase signal is transmitted to a coolant input amount control unit (not shown) of the vehicle body cooling module 10 so that the flow rates of the coolant are within the normal range (sixth operation, ③).

Through the above process, temperatures and flow rates of the coolant circulating the vehicle body cooling module 10 and the battery system 20 are maintained within the normal ranges, and thus there are effects of effectively cooling the battery and preventing a fire outbreak. More specifically, normal ranges of temperatures and flow rates of coolants may be different according to types of vehicles and are not specifically limited in the embodiment of the present invention.

As described above, the coolant inflow management device 100 according to the embodiments of the present invention can measure change amounts of temperature and flow rate of the coolant in real time while the coolant passes through the battery system and continuously manage cooling of the battery system 20. Conventionally, since only a temperature of a coolant flowing into a battery system 20 is measured without measuring a temperature of the coolant passing through the battery system 20, the battery system 20 may be vulnerable to a fire accident due to overheating of a battery. On the other hand, since the coolant inflow management device 100 of the present invention measures states of the coolant when the coolant flows into and from the battery system 20, the coolant inflow management device 100 has an effect of effectively cooling the battery. That is, the coolant inflow management device 100 of the present invention can prevent a fire due to overheating of the battery.

In addition, the coolant inflow management device 100 according to the embodiments of the present invention controls a temperature of the coolant and a flow rate of the coolant, and thus there is an effect that the coolant can efficiently cool the battery system 20. Specifically, the coolant inflow management device 100 of the present invention decreases a flow rate of the coolant when the coolant passes through the battery system 20 with an excessively high flow rate and increases a flow rate of the coolant when the coolant passes through the battery system 20 with an excessively low flow rate, and thus the coolant can effectively absorb heat generated by the battery.

A coolant inflow management device according to embodiments of the present invention can continuously manage cooling of a battery system by measuring change amounts of a temperature and a flow rate of a coolant in real time while the coolant passes through the battery system. Conventionally, since only a temperature of a coolant flowing into a battery system is measured without measuring a temperature of the coolant passing through the battery system, the battery system can be vulnerable to a fire accident due to battery overheating. On the other hand, since the coolant inflow management device of the present invention checks states of the coolant when the coolant flows into and from the battery system, there is an effect that a battery can be effectively cooled. That is, the coolant inflow management device of the present invention can prevent a fire due to overheating of the battery.

In addition, the coolant inflow management device according to the embodiments of the present invention has an effect of controlling a temperature of the coolant and a flow rate of the coolant to allow the coolant to efficiently cool the battery system. Specifically, by using the coolant inflow management device of the present invention, the coolant can effectively absorb heat generated in the battery by decreasing a flow rate of the coolant when the coolant passes through the battery system with an excessively high flow rate and increasing a flow rate of the coolant when the coolant passes through the battery system with an excessively low flow rate.

However, the technical effects which can be obtained through embodiments of the present invention are not necessarily limited to the effects described above. Other technical effects which are not described may be clearly understood by those skilled in the art to which the present invention belongs from the other descriptions of the specification such as the detailed description.

While exemplary embodiments of the present invention have been described above, the present invention may be variously modified and changed by those skilled in the art by adding, changing, and removing components without departing from the spirit of the present invention, and the other embodiments will fall within the scope of the present invention.

What is claimed is:

1. A coolant inflow management device disposed in each of a portion through which a coolant flows into a battery system (20) from a vehicle body cooling module (10) and a portion through which the coolant flows from the battery system (20) to the vehicle body cooling module (10) to measure, compare, and adjust flow rates and temperatures of the coolant, the coolant inflow management device comprising:

a rotation unit (110) which is rotated by movement of the coolant and measures the flow rate and the temperature of the coolant;

a rotation panel control unit (120) which measures and adjusts a number of revolutions of the rotation unit (110); and a communication module (130) which transmits values measured by the rotation unit (110) and the rotation panel control unit (120) to a battery management system (BMS) and receives a signal from the BMS, wherein the rotation unit (110) includes:

a rotation panel (112) formed as a panel type member and rotated by an inflow of the coolant; and a shaft (111) on which the rotational panel (112) is disposed and which is connected to the rotation panel control unit (120) so that a rotational speed of the shaft (111) is adjusted, wherein the rotation panel (112) farther includes a temperature detection unit (112*a*) which measures the temperature of the coolant and transmits information on the measured temperature to the communication module (130).

2. The coolant inflow management device of claim 1, wherein the rotation panel control unit (120) includes:

a revolutions per minute (RPM) measurement unit (121) which measures RPM of the rotation unit (110) and transmits information on the measured RPM to the communication module (130); and a rotation amount control unit (122) which decreases or increases a rotational speed of the rotation unit (110) when the RPM of the rotation unit (110) is out of a normal range.

3. The fuel coolant inflow management device of claim 1, wherein the rotation panel (112) further includes a flow rate detection unit (112B) which measures the flow rate of the coolant and transmits information on the measured flow rate to the communication module (130).

* * * * *